Patented Sept. 10, 1946

2,407,247

UNITED STATES PATENT OFFICE 2,407,247

BONDED ADSORBENT

Southwick W. Briggs, Washington, D. C.

No Drawing. Application November 19, 1940,
Serial No. 366,304

4 Claims. (Cl. 252—269)

This invention relates to adsorbents, and more particularly has reference to an adsorbent block, mass or small unit, composed of particles having submicroscopic pores, which particles are united by a waterproof bond that does not impair the adsorptive properties of such particles.

There have been various proposals for bonding adsorbent particles, some of which have contemplated the use of sodium silicate to form the bonding medium. For instance, in Briggs and Gilbert United States Patent No. 2,057,414, there is disclosed a process for the bonding of various adsorbents, such as fuller's earth, by the use of a sodium silicate solution having such a regulated viscosity that the silicate "sets" so rapidly that pores are formed therein, thus providing a porous and adsorptive bonded mass. Furthermore, in the Greger U. S. Patent No. 2,261,517, the bonding of adsorbent particles is effected by the conjoint use of an anhydrous sodium silicate powder and a sodium silicate solution.

In practicing these two inventions for the bonding of fuller's earth, I have observed certain unexpected phenomena. For instance, the "wet strength" of the bond—that is, its ability to stand up in the presence of moisture—varies with different types of fuller's earth used. In the case of certain fuller's earth coming from the Illinois area, and which is dark red in color, I have noticed that the bond secured when using sodium silicate is highly resistant to moisture and has an excellent wet strength. On the other hand, I have found that when either of the above mentioned processes is employed to bond Florida fuller's earth, a waterproof bond is not secured. The Florida earth is grayish in color and, while the Illinois and Florida earth appear to have the same aggregate iron content, I believe that the Illinois earth is relatively high, and the Florida earth is relatively low, in ferric oxide. My work to date indicates that the wet strength of the bond is a function of the ferric content available for reaction with the sodium silicate. I therefore propose the inclusion in such batch, either by proper selection of the fuller's earth or by the addition of supplemental ferric oxide to the batch, of sufficient ferric oxide to insure a bond of requisite wet strength.

Furthermore, both of the above mentioned patents indicate the desirability or essentiality of having the adsorbent material fully dehydrated before mixing with the bonding agent. To this end, roasting of the raw material at a temperature of 1100° F. is recommended, and there is advice in both documents to maintain exposure of the roasted material to the air at a minimum until the material has been bonded. From my experiments and practice, it would appear that a limited amount of moisture in the adsorbent to be bonded does not seriously injure the final product, and I have produced entirely satisfactory blocks from particles containing in the neighborhood of 3% moisture in combined or free form.

While my work has been directed principally to the bonding of fuller's earth, I have conducted sufficient research to lead me to believe that the principles underlying the present invention are applicable to other types of adsorbents, such as, particularly, bauxite and activated charcoal. It is difficult, if not impossible, to determine all of the chemical reactions entering into bonding of various adsorbents by the use of sodium silicate, particularly where, as in the case of fuller's earth or bauxite, the adsorbent contains a multiplicity of compounds. In general, however, I believe that the sodium silicate reacts with certain of the ingredients of the adsorbents, particularly the metallic compounds thereof, to form metallic silicates, and that there is a variance between the several metallic silicates as to wet strength. In any event, I have found that the presence of ferric oxide in the mix (whether inherently in the adsorbent or added separately to the mix) insures a waterproof bond. And I bel'eve that this condition obtains regardless of the specific type of adsorbent raw material used. Therefore, while I shall describe the process and product by reference to fuller's earth, my invention is not to be limited to an adsorbent composed of fuller's earth.

It will be appreciated that in operation most clarifiers or filters for oil are exposed to moisture, as in the case of crankcase oil filters for instance. Therefore, while the product made from the process here disclosed is susceptible of wide and various uses, it finds particular application in the field of oil filters. I have found that filter blocks made up in accordance with my invention have stood up remarkably well under severe operating conditions and where the oil being treated has had a relatively large aqueous content.

The principal object of this invention is to provide a satisfactory bonded adsorbent.

A more specific object of this invention is to provide a process and a bonded adsorbent in which the bonded adsorbent possesses the requisite and desirable wet strength.

Yet another object of this invention is to provide a process for the bonding of an adsorbent which does not necessitate complete dehydration or activation of the proposed adsorbent material before admixture with the bonding agent.

A still further object of this invention is to provide a material for use in the filtering of oils which is relatively free from the danger of disintegration due to the presence of moisture in the oil.

To accomplish these objects, my invention in general embraces the concept of bonding a previously activated adsorbent material, or a material which may be rendered adsorbent by activation subsequent to bonding, by the use of sodium silicate and ferric oxide or the reaction product of said materials. Preferably, though not necessarily, an adsorbent material that has been partly, but not completely, dehydrated is employed. If this material contains sufficient ferric oxide, there is mixed therewith sodium silicate, either alone or in conjunction with other materials such as disclosed in the previously mentioned Patent No. 2,261,517, thus relying upon the ferric oxide in the adsorbent to provide the iron for reaction with the sodium silicate. If, on the other hand, the adsorbent material does not include a sufficient quantity of ferric oxide for reaction with the sodium silicate, then ferric oxide may be added to the adsorbent material and the sodium silicate added thereto. Any suitable adsorbent material, such as fuller's earth, bauxite, activated charcoal, silica gel, etc., may be used, and these materials may be either fully activated, partially activated, or unactivated at the time that the particles are bonded. The sodium silicate may be of the so-called "J" Brand, such as set forth in Patent 2,057,414 which is of such viscosity that, in setting, pores are formed therein; or the sodium silicate may be provided partly in the form of powder and partly in the form of a solution, along the lines set forth in Greger United States Patent 2,261,517. Likewise additive reagents, such as, for instance, zinc oxide, may be used, as disclosed in the said patents.

As indicated above, one embodiment of my invention contemplates the careful selection of the adsorbent material to be used with the view particularly of securing a sufficient $Fe_2O_3$ content therein. This selection may be based upon chemical analysis, and the exact $Fe_2O_3$ content desired in any particular case will depend upon various factors, such as the intended use of the final product, the nature of the other components of the adsorbent material, and the precise type and amount of sodium silicate that is to be used. Under some conditions, the $Fe_2O_3$ content should be a theoretical amount necessary for reaction with the sodium silicate that is used. This theoretical amount would be in the same ratio to the amount of sodium silicate as the ratio of the molecular weights of these two compounds. In general, however, a rough selection may be made visually on the basis of color, as above mentioned—namely, the more red the adsorbent is, the higher its $Fe_2O_3$ content.

When satisfied that the adsorbent contains a sufficient amount of a ferric oxide, it may be crushed and ground to the desired size, and then bonded by the use of sodium silicate in any desired manner, as for instance by either of the processes set forth in the above mentioned patents. As previously pointed out, the adsorbent need not necessarily be completely dehydrated and activated prior to the bonding step, and in the case of some adsorbents, such as bauxite, all activation may be postponed until after the bonding.

The bonded material may be suitably treated in accordancce with well-recognized practices, by way of molding, roasting, etc., and the finished product may be used in the form of a block or large mass, or it may be crushed into smaller units which may be used as a filter bed through which oil or other fluid may be passed for treatment.

It should be stated that, in selecting an adsorbent that naturally contains sufficient $Fe_2O_3$ to form a waterproof bond, some care should be exercised to prevent the selection of an adsorbent having an excessive amount of $Fe_2O_3$. It appears that ferric oxide accelerates the rate of setting of the sodium silicate, and, for instance, in working with certain lots of fuller's earth having a high $Fe_2O_3$ content, I have found that the mass sets so quickly, on addition of sodium silicate, that difficulty is experienced in thoroughly mixing and molding the mass. Consequently, while it is desirable to have a sufficient ferric oxide content to insure a waterproof bond, an adsorbent that has such excessive amounts of ferric oxide should be avoided.

As indicated above, another embodiment of my invention contemplates the addition of regulated quantities of ferric oxide to the mix. The exact amount so added will vary with certain conditions, but principally the original ferric oxide content of the adsorbent and the amount of sodium silicate used will be determinative. Perhaps the best illustration of this form of my invention is by reference to an actual operation. In that case Florida's fuller's earth of a gray color which had been crushed and roasted in the mill at a temperature of 1000 to 1100° F. was used. It should be pointed out that this roasting reduced the moisture content of the earth to approximately 1½% which was in the form of water of constitution, but between such roasting and the time that it was bonded, the earth had picked up moisture from the atmosphere to the extent of 1 to 1½% which of course was present in the form of free moisture. So, at the time of bonding, the fuller's earth had an aggregate moisture content in the neighborhood of 3%, as distinguished from the prior processes of the above mentioned patent and application, which call for a substantially fully dehydrated material.

To 21 pounds of this fuller's earth there were mixed 1 pound and 14 ounces of ferric oxide and 1 pound of SSC sodium silicate, an anhydrous powder having an $SiO_2$–$Na_2O$ ratio of 2:1. These materials were thoroughly mixed, and to the mix there was added sodium silicate solution at the rate of 10 ounces of solution to 1 pound of the mix. The particular sodium silicate solution used in this case was so-called "C" brand, which was a solution of 36% $SiO_2$ and 18% $Na_2O$, of about 59.1° Baumé. When the solution was added to the mix described above, a tacky mass was produced which was molded into the form of filter blocks.

It might be pointed out that, if desired, zinc oxide, or some other metallic oxide capable of reacting with the sodium silicate, may be substituted for part of the ferric oxide. As an illustration of this, I have used 8 ounces of zinc oxide and 1.4 pounds of ferric oxide in lieu of the 1 pound and 14 ounces of ferric oxide mentioned above.

As indicated, the bonded mass may be molded into the form of blocks or other desirable shapes, which of course must be done while the mass is in a tacky condition. The molded shapes may then be dried and baked in accordance with the usual practice for activation of the particular adsorbent, and, in the specific case mentioned above, the blocks were baked at temperatures between 800 and 900° F. for approximately 1¾ hours. This baking stage not only dries the molded product and activates, or reactivates, the adsorbent, but also causes the ferric oxide and other metallic oxides to react with the sodium silicate to form metallic silicates composed of one or more metals.

The molded and activated adsorbent may be used in the form of a block, or the block may be crushed into smaller units as mentioned above. In either case, the product provides an extremely efficient filtering medium for oils, although its use is not limited to this field. In general, it finds particular application where a bonded porous material is subjected to moisture and where it is desired to insure a bond of acceptable wet strength.

It will be appreciated that the detailed processes described above may be modified without departing from the scope of my inventive concept. Without being limited thereto, I would specifically mention that the general processes outlined in either Patent 2,057,414 or the Greger United States Patent 2,261,517, or any other "sodium silicate process," might be modified to embrace the present invention, and obviously the precise ingredients mentioned above, their respective amounts, the sequence of steps, and temperatures and times recited, may be varied within relatively wide limits.

I claim:

1. A method of forming an adsorbent body having an increased wet strength comprising forming a mixture of particles of a material having submicroscopic pores and adapted to serve as an adsorbent, ferric oxide, a basic acting material and sodium silicate, and reacting the sodium silicate with the basic acting material and ferric oxide to form a bond for the particles of adsorbent material, the incorporation of the ferric oxide in the bond serving to increase the wet strength of the bond.

2. An adsorbent body produced by the method defined in the preceding claim.

3. A method of forming an adsorbent body having an increased wet strength comprising forming a mixture of particles of a material having submicroscopic pores and adapted to serve as an adsorbent, ferric oxide, a basic acting material and powdered sodium silicate, adding to said mixture sodium silicate solution, molding the resulting mixture to form the body, and baking the so formed body to cause the ferric oxide and basic acting material to react with the sodium silicate.

4. An adsorbent body produced by the method defined in claim 3.

SOUTHWICK W. BRIGGS.